United States Patent [19]

Stewart

[11] 4,342,109
[45] Jul. 27, 1982

[54] CARRIAGE ALIGNMENT APPARATUS FOR VIDEO DISC PLAYER

[75] Inventor: Myron C. Stewart, Indianapolis, Ind.

[73] Assignee: RCA Corporation, New York, N.Y.

[21] Appl. No.: 156,999

[22] Filed: Jun. 6, 1980

[51] Int. Cl.³ ................................................ G11B 3/10
[52] U.S. Cl. ...................................... 369/249; 369/77; 369/219; 369/221; 369/255
[58] Field of Search ................. 369/77, 215, 219, 220, 369/221, 256, 265, 249, 244, 255, 271, 223, 224; 33/323

[56] References Cited

U.S. PATENT DOCUMENTS 3,356,372 12/1967 Rabinow ............................ 369/255

FOREIGN PATENT DOCUMENTS 856077 11/1952 Fed. Rep. of Germany ...... 369/219
1326842 8/1973 United Kingdom .

Primary Examiner—Steven L. Stephan
Attorney, Agent, or Firm—E. M. Whitacre; J. S. Tripoli; D. A. Kulkarni

[57] ABSTRACT

In a video disc player, a support roller is mounted to one end of a pickup carriage by means of an eccentric stud. The height of the roller in respect of the carriage is adjusted by changing the angular position of the eccentric stud. A support bracket is disposed at the other end of the carriage, where a pair of adjustable members are provided for adjustment of the relative spatial position of the carriage and the support bracket.

3 Claims, 10 Drawing Figures

CARRIAGE ALIGNMENT APPARATUS FOR VIDEO DISC PLAYER

This invention relates to a disc record player, and more particularly, to a video disc type record player.

In certain systems, video information is stored on a disc record in the form of geometric variations in a continuous spiral track disposed on the record surface. The variations in capacitance between an electrode carried by a record-engaging stylus and a conductive property of the record are sensed to reproduce the stored information. A capacitance-type pickup system is illustratively disclosed in U.S. Pat. No. 3,842,194 (Clemens).

In such systems, the player typically includes a turntable for centering and rotatably supporting a video disc. The pickup stylus is disposed at one end of a stylus arm. The other end of the stylus arm is supported by a compliant coupler in a carriage. Disposed in the bottom wall of the carriage is an opening through which the stylus is selectively lowered for record engagement. During playback, the carriage is translated along parallel guiderails across a turntable-supported record in correlation with the radial motion of the track-following stylus.

To protect the video disc record, it is beneficial to enclose it in a caddy which comprises an outer jacket and a record retaining spine. For record loading, a full caddy is inserted into an input slot provided in the player. A record extraction mechanism disposed in the player removes the record/spine assembly from the jacket for retention in the player during subsequent jacket withdrawal. The retained record/spine assembly is supported in the player on a set of receiving pads. To transfer the record to the turntable for playback, the turntable is raised relative to the receiving pads. The record player is provided with hold-down members which hold the retained spine in place while allowing the retained record to be picked up by the turntable when it is raised. During playback, the pickup stylus is traversed radially across the record while the turntable spins the record at the desired speed (e.g., 450 rpm). For record retrieval, the record is transferred back to the receiving pads by lowering the turntable with respect to the receiving pads to redefine the record/spine assembly. An empty jacket is then inserted into the player, whereby the record/spine assembly is returned back into the jacket. Withdrawal of the caddy from the players effects record retrieval. Reference is made to U.S. patent application, Ser. No. 122,959, entitled "STYLUS CLEANING APPARATUS FOR VIDEO DISC PLAYER", and filed in the name of L. M. Hughes et al, now U.S. Pat. No. 4,285,524 for an example of a video disc player of the type mentioned above.

In the systems of the type mentioned above, the spacing between the carriage and the turntable-supported record is critical. The record/carriage spacing defines the attitude of the stylus electrode with respect to the record, which, in turn, has bearing on signal reproduction. Moreover, the record/carriage spacing determines the capacitance between the conductive property of the record and a conductive property of the carriage, which is disposed at ground potential. The record/carriage capacitance defines the electrical return path of the pickup circuits, and, therefore, also affects the playback operations.

In accordance with the present invention, an apparatus is provided for aligning the carriage with respect to the carriage guiderails in the player. The subject alignment apparatus comprises a centrally-apertured roller subject to engagement with one of the guiderails, and a fastener having an eccentric boss subject to reception in the aperture disposed in the roller and serving to secure the roller to one end of the carriage. The angular position of the fastener is adjusted to vary the height of the carriage with respect to the roller, and, in turn, the height of the carriage relative to the respective one of the guiderails.

Pursuant to a further feature of the invention, means are provided for adjusting the physical spacing and the angular position of the carriage with respect to a support bracket which is subject to engagement with the other of the guiderails.

In the practice of the present invention, the positions of the roller and the support bracket with respect to the carriage are adjusted on an alignment fixture, and the aligned carriage assembly is installed in the player. The height of the turntable is then adjusted to provide proper spacing between the turntable and the carriage. U.S. patent application Ser. No. 148,467 entitled "TURNTABLE HEIGHT ADJUSTING APPARATUS FOR VIDEO DISC PLAYER", filed in the name of C. A. Elliott, describes the details of the turntable height adjustment.

Important considerations in the design of the player are manufacturability of its components, ease of assembly and reduction of the cost of the player. To this end, it is desirable to relax mechanical tolerances on player components. The relaxation of mechanical tolerances causes a tolerance buildup for which compensation should be provided. The subject alignment apparatus allows relaxation of tolerances, which, in turn, permits cost reduction.

Figure 1:
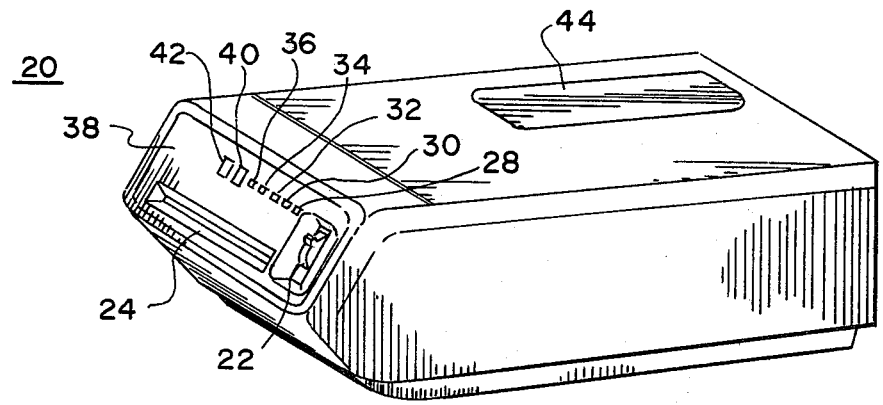
FIG. 1 shows a video disc player incorporating the carriage alignment apparatus according to the instant invention.
Figure 2:
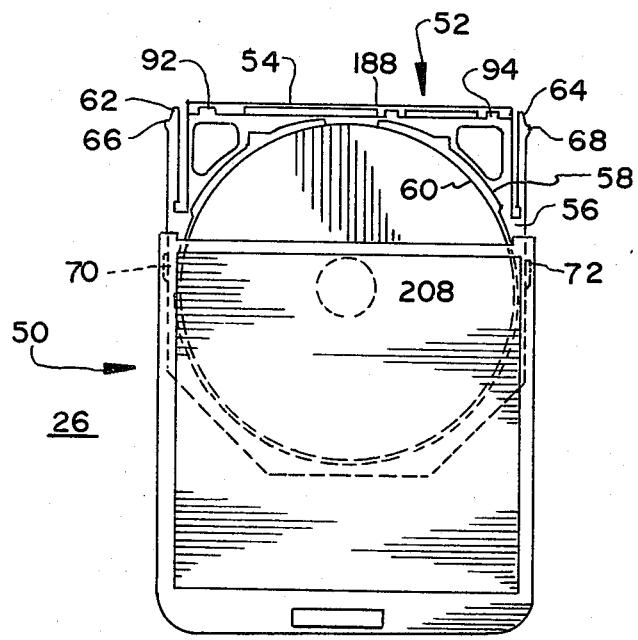
FIG. 2 illustrates a video disc caddy suitable for use with the player of FIG. 1.
Figure 3:
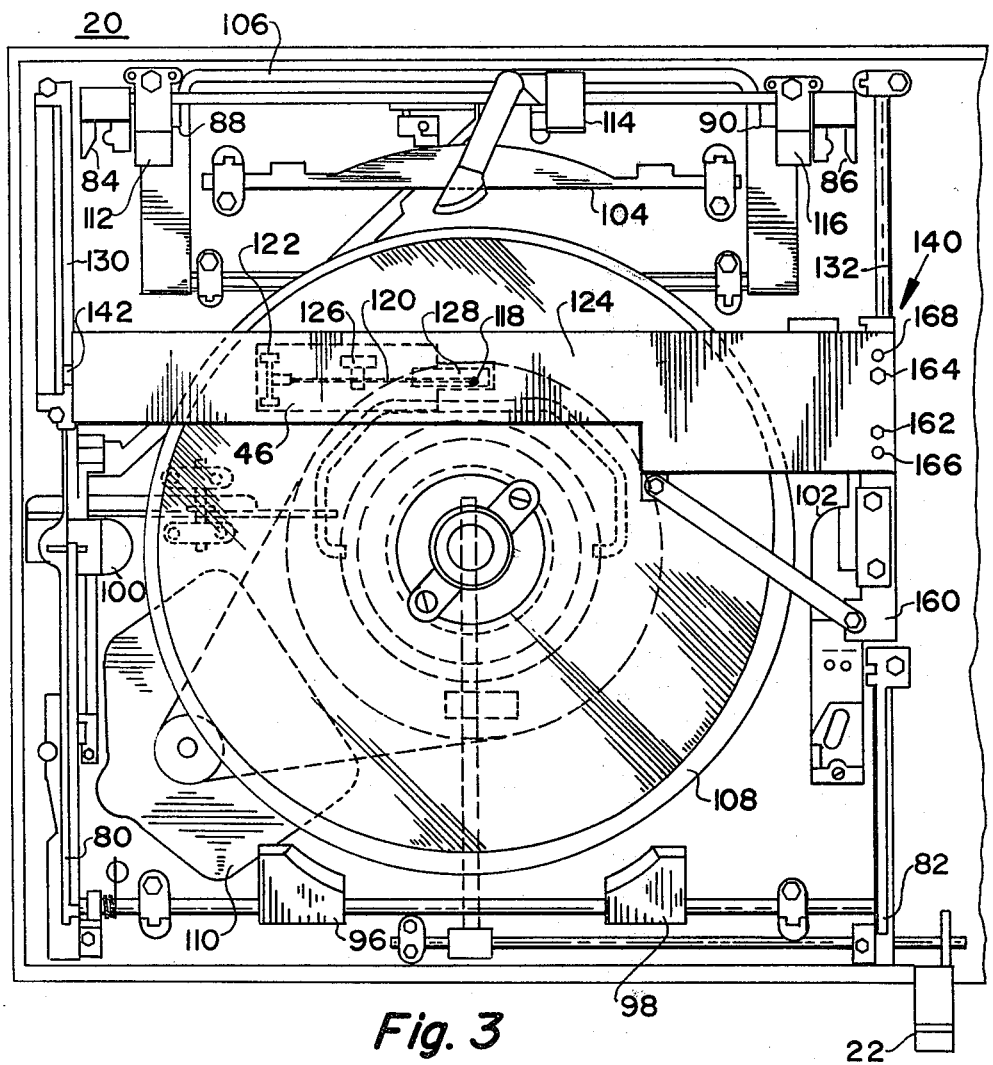
Figure 4:
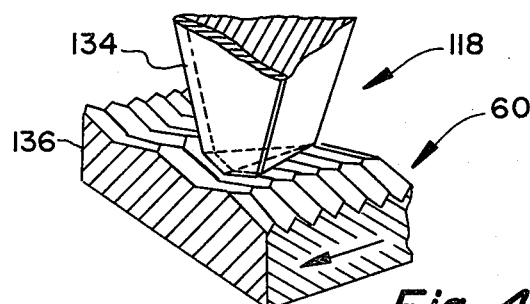
Figure 5:
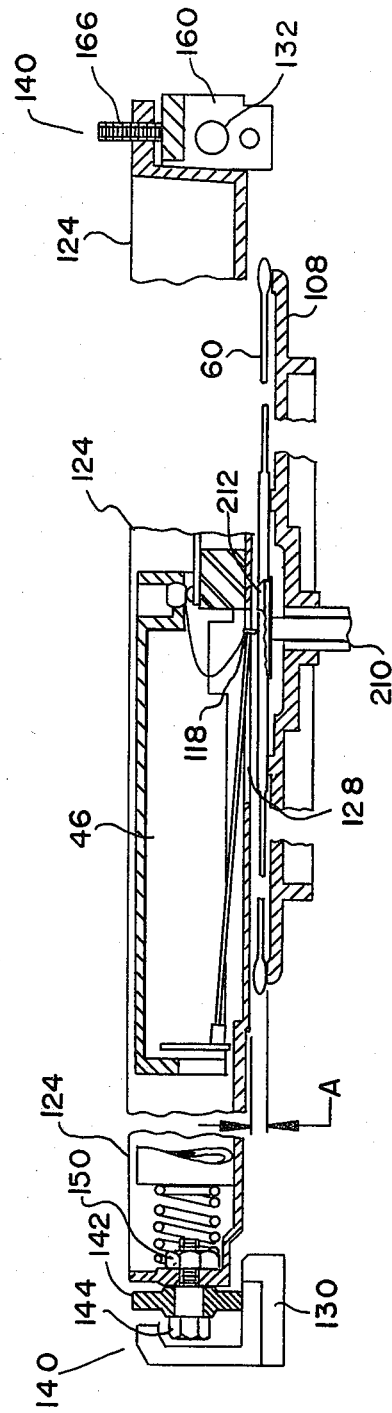
Figure 6:
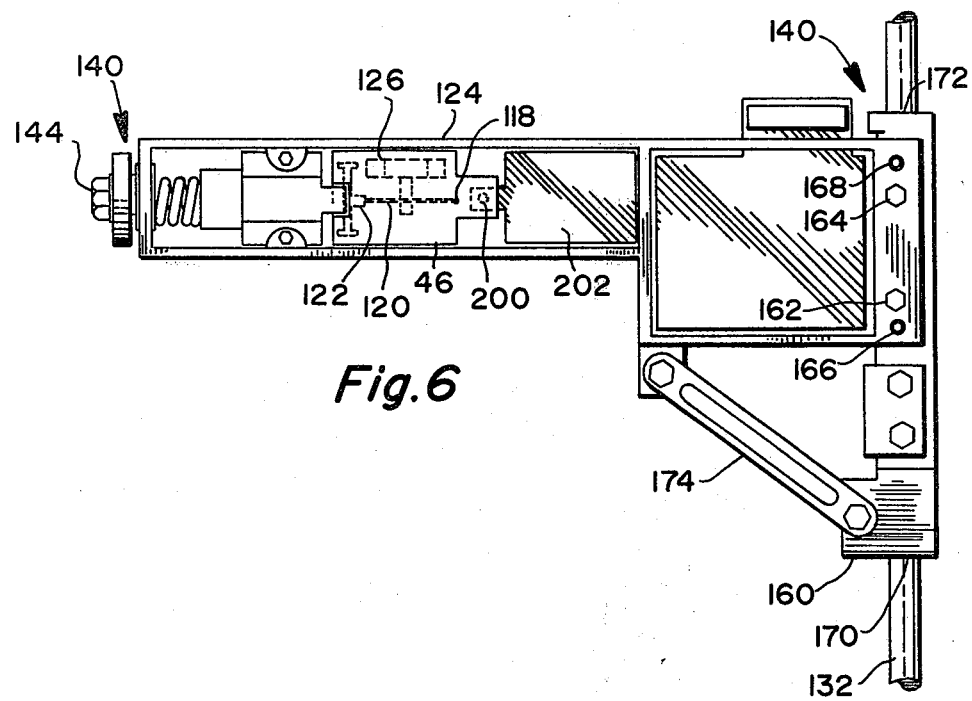
Figure 7:
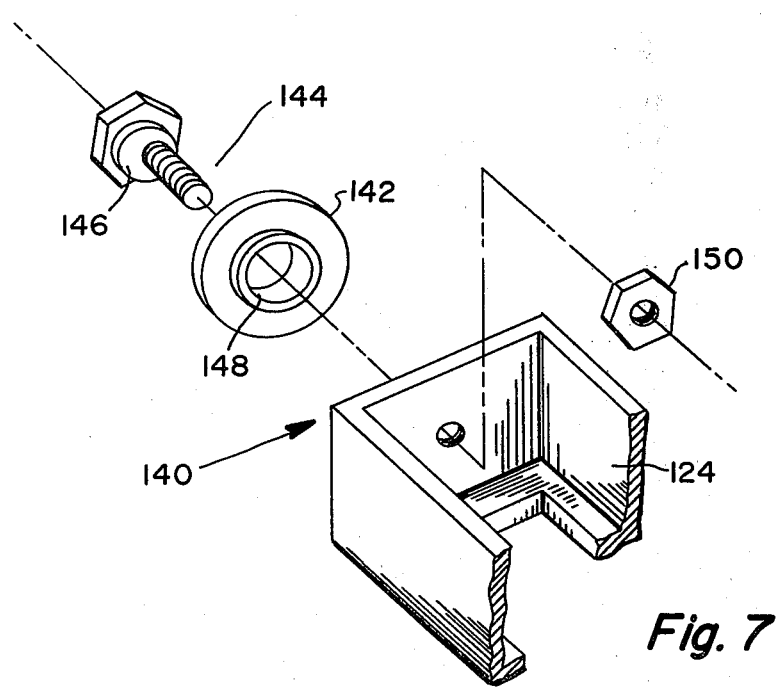
Figure 8:
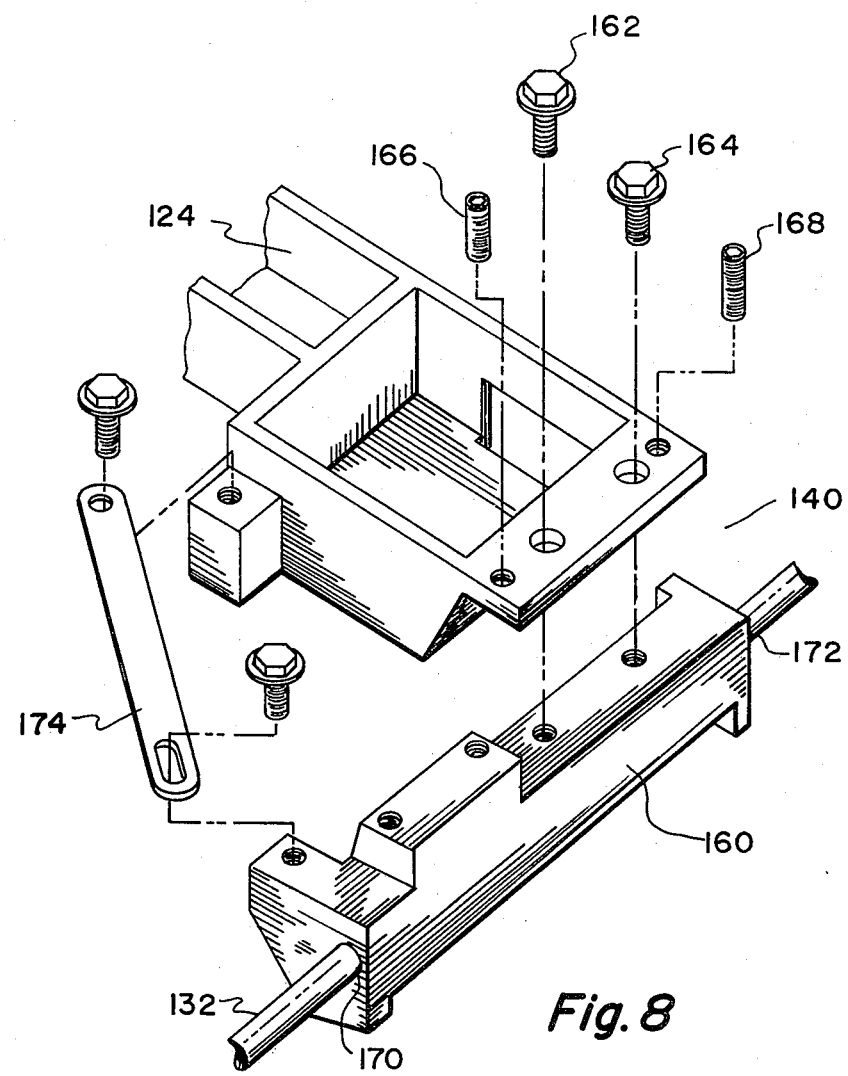

FIG. 3 provides a plan view of the player of FIG. 1;

FIG. 4 illustrates the capacitance pickup concept employed in the player of FIG. 1;

FIG. 5 is a sectional side view of the player of FIGS. 1 and 2 showing the relationship between the carriage and a turntable-supported record;

FIG. 6 represents a plan view of the subject carriage alignment apparatus;

FIGS. 7 and 8 depict details of the carriage alignment apparatus of FIG. 6; and

Figure 9:
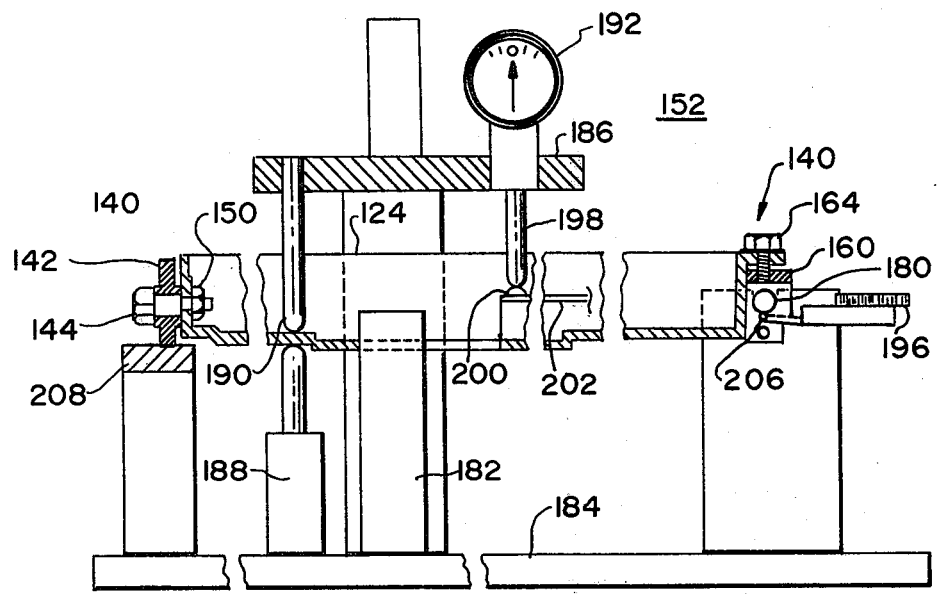
Figure 10:
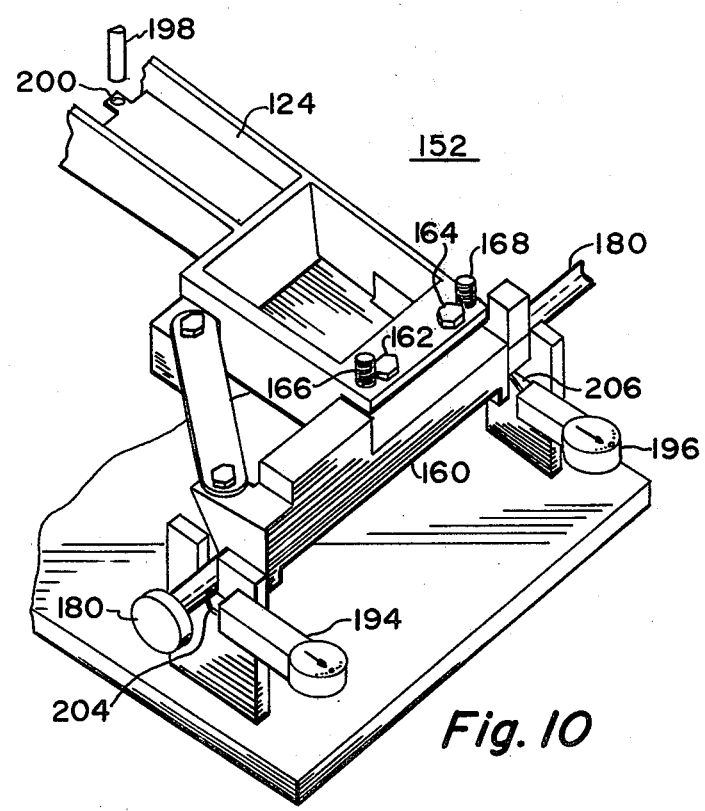

FIGS. 9 and 10 show a setup fixture for use in the alignment of the carriage prior to installation thereof in the player.

Shown in FIG. 1 is a video disc player 20 having the subject carriage aligning apparatus. A function lever 22 is subject to disposition in any one of three positions—OFF, PLAY and LOAD/UNLOAD. A door flap closes a caddy input slot 24 when the function lever 22 is disposed in the OFF and PLAY positions. In the LOAD/UNLOAD position of the function lever 22, the door flap is opened to permit insertion of a caddy 26, shown in FIG. 2, into the player to load an enclosed record therein. A pushbutton 28 is provided to dispose the player in the "PAUSE" mode. A set of pushbuttons 30, 32, 34 and 36 are arranged on the instrument panel 38 to dispose the player in any one of four "SEARCH" modes, i.e., rapid access (forward/reverse) and visual search (forward/reverse). A digital readout 40 provides an indication of playing time and other functions, such as PAUSE, LOAD/UNLOAD and END-OF-PLAY, etc. A pair of tally lights 42 are operated to provide an indication of the record side subject to play, e.g., "SIDE 1" and "SIDE 2". An access door 44 is disposed on the cover of the player to provide access to a stylus cartridge 46 (FIG. 3).

As shown in FIG. 2, the video disc caddy 26 comprises a jacket 50 having an edge opening and a substantially planar, record retaining spine 52. The spine 52 has a portion 54 which serves as a closure and a further portion 56 having a circular opening 58 for receiving a record 60. The spine 52 is further provided with integrally-molded, flexural latch fingers 62 and 64. Each of the spine latch fingers 62 and 64 has a protruding element 66 and 68. The protruding elements 66 and 68 are received in pockets 70 and 72 disposed in the jacket 50 for locking the spine 52 in place when it is fully inserted therein.

The operation of the caddy extraction mechanism will be first explained in conjunction with FIG. 3. To load a record into the player, a caddy is inserted into the input slot 24 along a path defined by guideways 80 and 82. As the caddy arrives at a fully inserted position in the player, latch defeat members 84 and 86 enter the jacket 50 to defeat the spine latch fingers 62 and 64 for freeing the spine 52 from the jacket. Pivotally mounted in the player are spine gripper members 88 and 90 which are recived in respective cutouts 92 and 94, arranged in the spine 52, when the caddy arrives at the fully inserted position in the player in order to lock the spine to the player. Since the spine 52 is released from the jacket 50 through the operation of the latch defeat members 84 and 86 and is latched to the player through the operation of the spine gripper members 88 and 90, subsequent withdrawal of the jacket leaves the record/spine assembly in the player. The spring-loaded receiver pads 96, 98, 100, 102 and 104 serve to accurately locate the retained spine/record assembly in the player. A pair of springs (not shown) disposed between a gripper arm 106, which carries the spine gripper members 88 and 90, and the latch defeat members 84 and 86 effect downward deflection of the latch defeat members during jacket withdrawal.

To transfer the retained record to a turntable 108, the function lever 22 is moved to the PLAY position, which, in turn, raises the turntable and starts a turntable motor 110. A set of hold-down members 112, 114 and 116 hold the retained spine 52 in place against the receiver pads 96-104 while permitting the retained record to be intercepted by the turntable 108 when it is raised. The hold-down members 112-116 also serve to accurately locate the retained spine 52, longitudinally and laterally, in the player.

A pickup stylus 118 is disposed at one end of a stylus arm 120, the other end of which is secured to the cartridge 46 by means of a rubber suspension 122. The cartridge 46 is installed in a compartment provided in a stylus arm carriage 124. Disposed in the carriage 124 is a stylus arm lifting/lowering mechanism 126 (e.g., of the type shown in U.S. Pat. No. 4,053,161) for selectively lowering the pickup stylus 118 through an opening 128 provided in the bottom wall of the carriage for record engagement. During playback, the carriage 124 is translated on guiderails 130 and 132 disposed parallel to the caddy guideways 80 and 82 from a starting position at the back of the player toward the front of the player in synchronism with the radially inward motion of the pickup stylus 118. In the manner indicated in FIG. 4, the variations in capacitance between an electrode 134 carried by the stylus 118 and a conductive property 136 of the record 60 are sensed to reproduce the stored information on the record. The recovered signals are processed to reconstruct a standard television signal containing picture and sound information for application to a television receiver.

To transfer the record back to the receiver pads 96-104 after playback, the function lever 22 is shifted back to the LOAD/UNLOAD position, which, in turn, lowers the turntable 108 to a level below the receiver pads. When the turntable 108 is lowered, the record is deposited on the receiver pads 96-104 for reception in the opening 58 disposed in the spine 52. The turntable motor 110 is shut off when the function lever 22 is displaced to the LOAD/UNLOAD position. To retrieve the record/spine assembly, the empty jacket 50 is inserted into the player through the input slot 24 along the guideways 80 and 82. As the jacket 50 arrives at the fully inserted position in the player, the front edge thereof engages the already deflected latch defeat members 84 and 86 to cause further downward deflection thereof. Such further downward deflection of the latch defeat members 84 and 86, in turn, effects downward displacement of the spine gripper members 88 and 90, whereby the spine 52 is freed from the player. When the jacket 50 is fully inserted into the player, the spine latch fingers 62 and 64 snap back into the pockets 70 and 72 to lock the spine 52 to the jacket. The record/spine assembly is withdrawn from the player when the caddy is extracted.

In the player of the type described above, it is desirable to precisely adjust the separation "A", shown in FIG. 5, between the carriage 124 and the turntable 108. The dimension "A" is, typically, 0.158±0.010 inches. An apparatus 140, in accordance with this invention, which allows achievement of accurate carriage/turntable alignment will now be described in conjunction with FIGS. 6-8. The subject alignment apparatus comprises a centrally-apertured roller 142 and a stud 144 having an eccentric boss 146 which is subject to reception in the aperture 148 disposed in the roller in the manner shown in FIGS. 6 and 7. The eccentric stud 144 is passed through the centrally-apertured roller 142, and fixedly secured to the carriage 124 at one end thereof by means of a nut 150. The angular position of the eccentric stud 144, which determines the height of the roller 142 relative to the carriage 124, is adjusted, prior to the installation of the carriage in the player, on a setup fixture 152, shown in FIGS. 9 and 10, in the manner described subsequently. The roller 142 rides on the carriage guiderail 130 as indicated in FIGS. 3 and 5.

At the other end of the carriage 124, a support bracket 160 is rigidly mounted by means of a pair of lock screws 162 and 164 and a pair of adjust screws 166 and 168. The physical spacing and the angular position of the carriage 124 relative to the support bracket 160 is adjusted by means of the setup fixture 152. The carriage guiderail 132 is passed through a pair of openings 170 and 172 disposed in the support bracket 160 in the manner indicated in FIGS. 6 and 8. A strut 174 is disposed between the support bracket 160 and the carriage 124 to further rigidify the assembly.

The carriage alignment procedure will now be described with the aid of FIGS. 9 and 10. The nut 150 securing the roller 142 of the carriage 124 is loosened, a guide rod 180 is threaded through the openings 170 and 172 in the support bracket 160, and the carriage is gently placed on the setup fixture 152. A keyhole locator 182 disposed on the base plate 184 of the setup fixture 152 engages the opening 128 in the bottom wall of the carriage 124 to assure proper longitudinal and lateral location of the carriage in respect of the setup fixture. The top plate 186 of the setup fixture 152 is then swung around to a position over the carriage 124 and then lowered. An air cylinder 188 is actuated to securely hold the carriage 124 against a pair of locating pins 190 to ensure proper vertical registration thereof.

The physical spacing and the angular position of the support bracket 160 with respect to the carriage 124 is adjusted by means of the adjusting screws 166 and 168 such that zero readings are obtained on a set of dial indicators 192, 194, and 196. The probe 198 of the dial indicator 192 senses the vertical position of a contact terminal 200 disposed on the pickup circuit board 202, which is used as one of the reference points. The probes 204 and 206 of the dial indicators 194 and 196 detect the vertical positions of the respective ends of the guide rod 180 to assure proper angular position of the carriage 124 relative to the bracket 160. After aligning this end of the carriage 124, the lock screws 162 and 164 are used to lock the bracket 160 in place. At the other end of the carriage 124, the angular position of the eccentric stud 144 is adjusted in a manner such that the periphery of the roller 142 engages a locating surface 208 disposed on the setup fixture 152.

After aligning both ends of the carriage 124, it is installed in the player. The vertical position of the turntable 108 is then adjusted with respect to the carriage 124 by inserting a wrench through the hollow turntable shaft 210, shown in FIG. 5, from the top and turning a threaded cap to vary the height of the turntable 108. As previously indicated, the spacing between the bottom surface of the carriage 124 and the top surface of the turntable 108, the dimension "A", is typically 0.158±0.010 inches. The turntable spindle 212 is then installed to complete the assembly. Reference may be made to the afore-mentioned application of Elliott for a more expanded description of the turntable height adjustment apparatus.

What is claimed is:

1. An alignment apparatus comprising:
  (A) a translatable pickup carriage having a pair of end walls; one of said end walls having an aperture disposed therein;
  (B) a carriage guide roller having a peripheral guiding surface and a coaxially-disposed hole;
  (C) an elongated element having a first portion, an eccentrically-disposed middle portion, and a further portion; said guide roller being rotatably disposed on said eccentric portion; said first portion being rotatably received in said aperture in said carriage wall; said first portion being turned in said aperture such that said peripheral guiding surface of said roller mounted on said eccentric portion occupies a desired spatial relationship with respect to said carriage; and
  (D) means for fixedly mounting said elongated element carrying said guide roller on said eccentric portion thereof to said translatable carriage at said one end thereof; said further portion of said elongated element serving to retain said guide roller on said eccentric portion.

2. The alignment apparatus as defined in claim 1 further including a carriage support bracket and means for mounting said bracket to the other end wall of said carriage such that said carriage and said bracket have a desired spatial relationship.

3. The alignment apparatus as specified in claim 2 wherein said bracket mounting means comprises a pair of adjustable members; said adjustable members permitting adjustment of the relative physical spacing and angular position of said carriage and said bracket.

* * * * *